United States Patent [19]

Bennett

[11] 4,203,287
[45] May 20, 1980

[54] POWER STEERING HYDRAULIC SYSTEM WITH A LOW PRESSURE EXPANSIBLE RESERVOIR

[75] Inventor: Jack L. Bennett, Reese, Mich.

[73] Assignee: General Motors Corporation, Detroit, Mich.

[21] Appl. No.: 19,119

[22] Filed: Mar. 9, 1979

[51] Int. Cl.² .......................................... F15B 21/04
[52] U.S. Cl. .................................... 60/329; 60/416; 137/563
[58] Field of Search ............... 60/329, 456, 477, 469, 60/592; 137/563, 564

[56] References Cited

U.S. PATENT DOCUMENTS

| | | | |
|---|---|---|---|
| 2,290,479 | 7/1942 | Mercier | 60/416 |
| 3,152,448 | 10/1964 | Mercier | 60/592 |
| 3,207,077 | 9/1965 | Zeigler et al. | 417/300 |
| 3,253,548 | 5/1966 | Zeigler et al. | 417/440 |
| 3,323,305 | 6/1967 | Klees | 60/469 |

Primary Examiner—Edgar W. Geoghegan
Attorney, Agent, or Firm—Donald F. Scherer

[57] ABSTRACT

A power steering system has a pump, a steering gear and pressure and return passages. The pump does not include a cover member which conventionally provides space for the storage of excess fluid. The return passage has an expansible chamber included therein which accommodates the fluid volume change within the system resulting from fluid temperature changes thus permitting hermetic sealing of the system. An aspirator can also be included within the expansible chamber to improve the inlet pressure condition at the pump.

1 Claim, 4 Drawing Figures

U.S. Patent
May 20, 1980
4,203,287
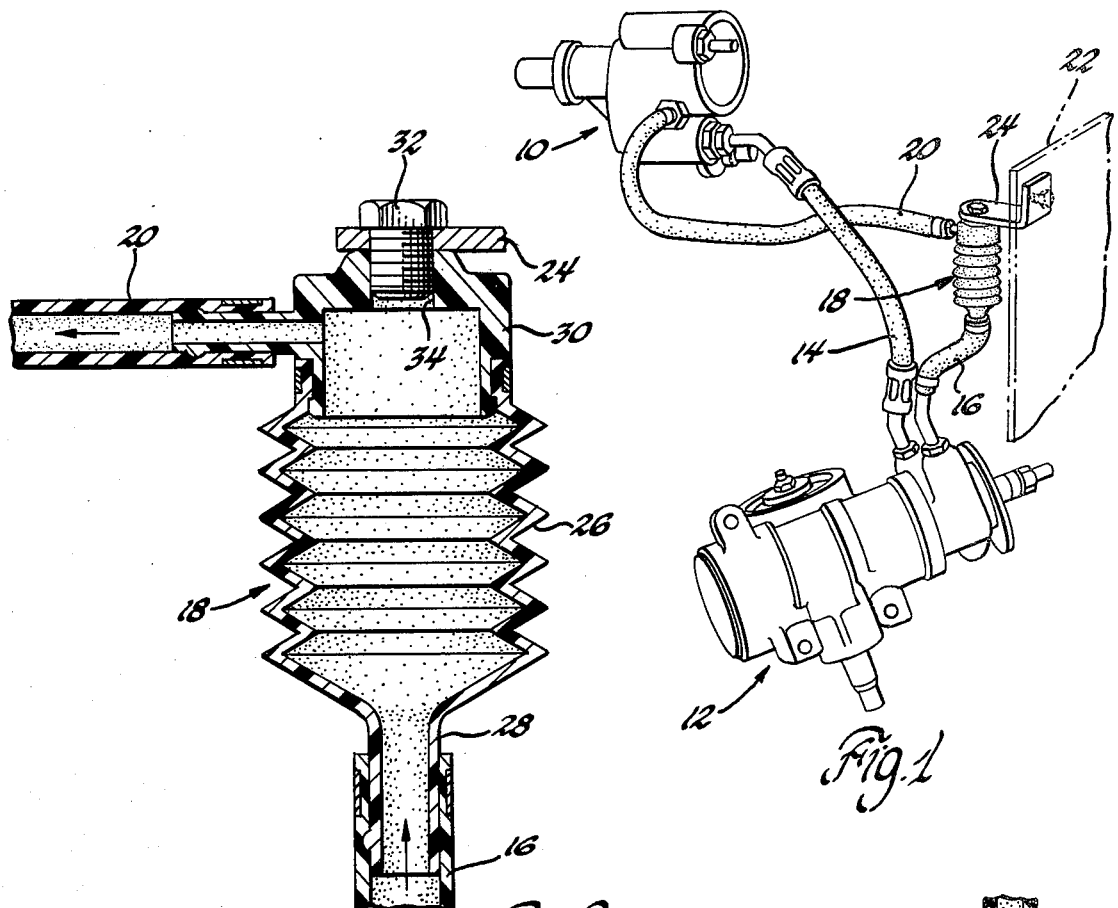
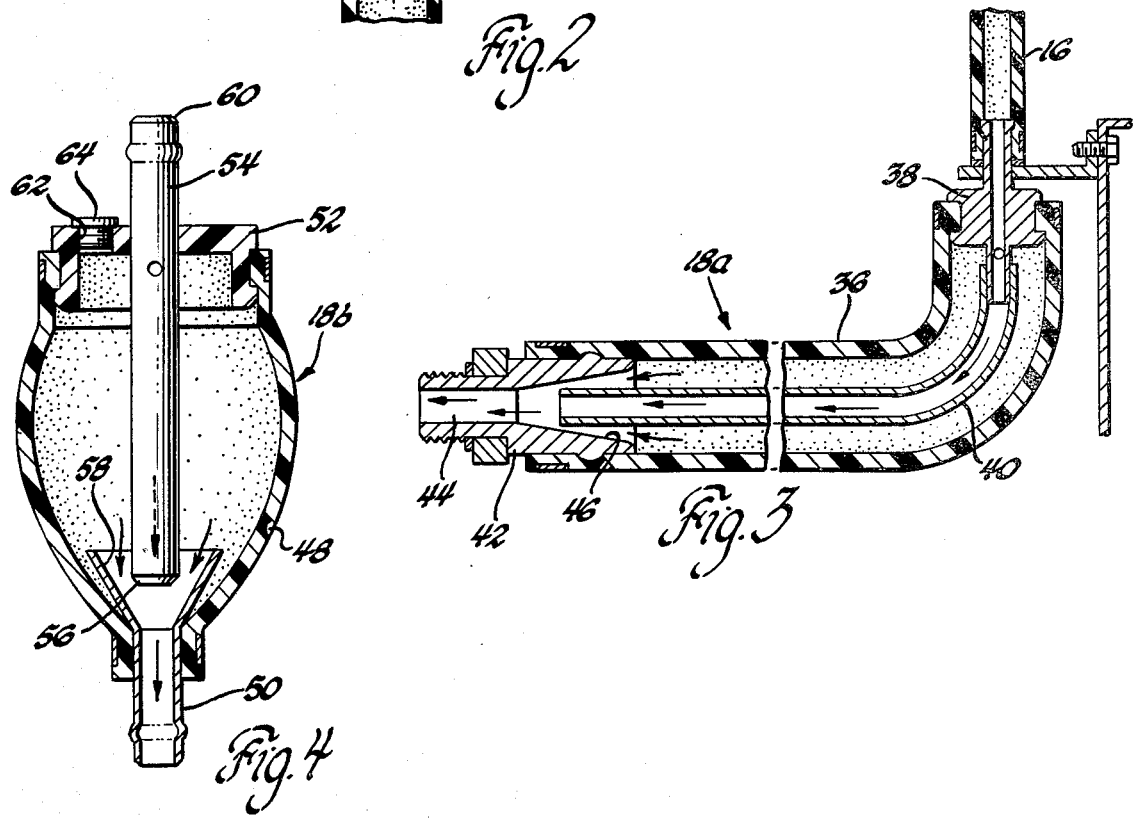

POWER STEERING HYDRAULIC SYSTEM WITH A LOW PRESSURE EXPANSIBLE RESERVOIR

This invention relates to power steering systems and more particularly to hermetically sealed power steering systems having an expansible fluid storage chamber.

Conventional power steering systems include a pump member with cover such as shown in U.S. Pat. Nos. 3,253,548 issued to Zeigler et al, May 31, 1966, and 3,207,077 issued to Zeigler et al, Sept. 21, 1965, and assigned to the assignee of the present invention. The cover for such pumps includes a cap which is removable to permit fluid to be added to the system and is vented to atmosphere so that the fluid contained therein can expand and contract in response to temperature changes.

The present invention utilizes some of the components of a conventional power steering system such as the pumping components (cam ring, vanes, etc.) and flow control valve shown in the above-mentioned United States patents. However, the vented reservoir is omitted with the present system and temperature change induced volume changes within the system are accommodated by an expansible storage chamber disposed in the low pressure or return line of the system.

In a system incorporating the present invention, the fluid is delivered from the pump to the steering gear and from the steering gear the fluid is returned to the pump through the expansible chamber. To improve the inlet pressure at the pump, an aspirator can be included in the expansible chamber. It is well known that aspirators will function to increase the volume of fluid downstream from the throat of the aspirator.

It is an object of this invention to provide an improved power steering system which is hermetically sealed and has an expansible chamber disposed in the low pressure portion thereof to accommodate fluid volume changes resulting from fluid temperature changes.

It is a further object of this invention to provide an improved power steering system which is hermetically sealed and has an expansible chamber disposed in the low pressure portion thereof to accommodate fluid volume changes resulting from fluid temperature changes and an aspirator is disposed within the expansible chamber to increase the inlet pressure at the pump.

These and other objects and advantages of the present invention will be more apparent from the following description and drawings in which:

FIG. 1 is a perspective view of a power steering system;

FIG. 2 is an enlarged cross-sectional view of the expansible chamber shown in FIG. 1;

FIG. 3 is a cross-sectional view of another embodiment of the expansible chamber; and FIG. 4 is a sectional view of a further embodiment of the expansible chamber.

Referring to the drawings, wherein like characters represent the same or corresponding parts throughout the several views, there is seen in FIG. 1, a hydraulic pump generally designated 10 which is adapted to be driven by an engine, not shown. The pump 10 delivers fluid under pressure to a steering gear generally designated 12 through a hose or passage 14. Fluid returning from the steering gear, at low pressure, is directed through a hose or passage 16 to an expansible chamber 18. The fluid in the expansible chamber 18 is directed to the pump 10 through a hose or passage 20. The steering gear 12 is assembled in a vehicle in a conventional manner to provide vehicle steering in a well known manner. The expansible chamber 18 is secured to a vehicle panel 22 by a bracket 24. The vehicle panel 22 can be any of the available panels such as the engine compartment wall or inner fender liner.

As can be seen in FIG. 2, the expansible chamber 18 has a bellows-shaped body 26 which is connected to the hose 16 by a cylindrical passage 28 and is connected to the hose 20 through a cap member 30. The cap member 30 is secured to the bracket 24 by a fastener 32 which also seals an opening 34 formed in the cap member 30. The opening 34 permits the power steering system to be filled with hydraulic fluid at assembly after which the opening 34 is sealed by the insertion of fastener 32.

As is well known in power steering systems, the hydraulic fluid within the system operates at a wide range of temperatures which results in an increase in volume as the temperature rises and a decrease in volume as the temperature is reduced. The bellows 26 is expansible and can therefore accommodate the volume changes which occur within the system so that venting to atmosphere is not necessary.

FIG. 3 shows another embodiment of an expansible chamber generally designated 18a. The expansible chamer 18a includes a generally cylindrical outer housing 36 made of expansible material such as rubber. The housing 36 is secured to a fitting 38 which in turn is connected to the hose 16. The fitting 38 is also connected to a passage or tube 40 which is disposed substantially parallel to the walls of housing 36. The housing 36 is also connected to an outlet fitting 42 which is adapted to be connected to the hose 20. The outlet fitting 42 has formed therein a passage 44 which is coaxially aligned with the passage 40 and which passage 44 is also in communication through a frustoconical section 46 with the interior of housing 36.

As fluid returning, from the steering gear 12, to the pump 10 flows through passage 40 and into passage 44, the frustoconical section 46 cooperates therewith to form an aspirator such that a low pressure region is created substantially adjacent the intersection of passage 44 and frustoconical section 46 so that the fluid within the housing 36 and external of the passage 40 is drawn into passage 44, in a well known manner, to provide a supercharging effect on the pump 10 which is located downstream of the aspirator. The housing 36 will expand and contract to accommodate volume changes which result from temperature changes in the hydraulic fluid during power steering operation.

There is shown in FIG. 4 a further embodiment of an expansible chamber generally designated 18b, which includes an expansible cup shaped body 48, a funnel shaped outlet fitting 50 and an inlet fitting 52. A passage 54 is secured in the inlet fitting 52 and terminates at an end 56 within the flared portion 58 of outlet fitting 50. The other end 60 of passage 54 is adapted to be connected to hose 16 and the outlet fitting 50 is adapted to be connected to the hose 20. The inlet fitting 52 has an opening 62 which is maintained closed and sealed during operation by a fitting 64. However, at assembly, the fitting 64 can be removed to fill the system with hydraulic fluid. The passage 54 and funnel shaped outlet fitting 50 cooperate to form an aspirator which operates in a manner similar to that described above in FIG. 3. The expansible cup shaped body 48 will expand and contract to accommodate volume changes which result from temperature changes.

The embodiments of the invention in which an exclusive property or privilege is claimed are defined as follows:

1. An improvement in power steering systems having a hydraulic pump and a steering apparatus with a high pressure hose for delivering fluid from the pump to the steering apparatus and a low pressure return line for directing fluid from the steering apparatus to the pump, said improvement comprising: an expansible chamber in the low pressure return line which changes in storage capacity in response to changes in the volume of fluid in the system occurring as a result of temperature changes whereby said power steering system can be sealed from the atmosphere, said expansible chamber having a fluid outlet; and aspirator means disposed within said expansible chamber adjacent said fluid outlet.

* * * * *